Figure 1:
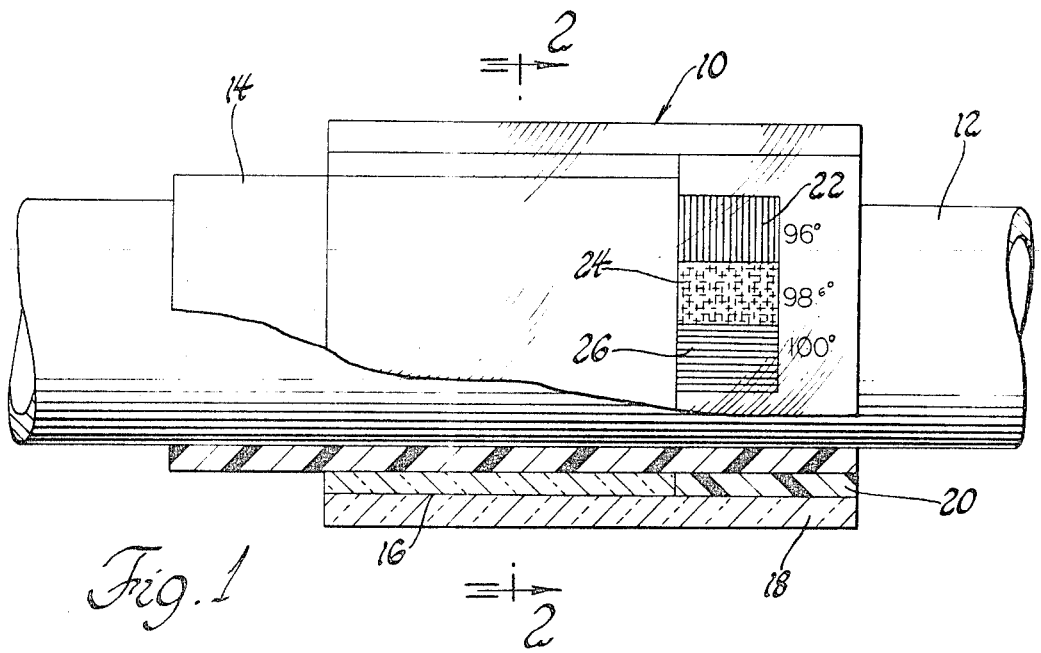

United States Patent
Brown

[15] 3,651,695
[45] Mar. 28, 1972

[54] COLORIMETRIC TEMPERATURE SENSOR

[72] Inventor: Verne R. Brown, Ann Arbor, Mich.

[73] Assignee: Environmental Metrology Corporation, Ann Arbor, Mich.

[22] Filed: Apr. 24, 1970

[21] Appl. No.: 31,483

[52] U.S. Cl. ............................................73/356, 116/114 V
[51] Int. Cl. ...........................................................G01k 11/16
[58] Field of Search ................73/356; 116/114 V; 252/408; 23/230 LC

[56] References Cited

UNITED STATES PATENTS

| 3,441,513 | 4/1969 | Woodmansee | 252/408 |
| 3,440,882 | 4/1969 | Jones | 73/356 |
| 3,469,448 | 9/1969 | Swengel | 73/356 |
| 2,932,971 | 4/1960 | Moore | 93/356 |

*Primary Examiner*—S. Clement Swisher
*Assistant Examiner*—Denis E. Corr
*Attorney*—McGlynn, Reising, Milton & Ethington

[57] ABSTRACT

A chromatic temperature indicator for fluid conduits including a black background layer on the conduit, a colorimetric layer of cholesteric material on the background, a nonpermeable plastic tube heat shrunk over the cholesteric layer and a color reference chart adjacent the cholesteric layer for indicating the color variations thereof and the temperatures corresponding to such variations.

4 Claims, 2 Drawing Figures

PATENTED MAR 28 1972

3,651,695

INVENTOR
Verne R. Brown
BY
Barnard, McGlynn & Reising
ATTORNEYS

COLORIMETRIC TEMPERATURE SENSOR

This invention relates to chromatic temperature sensors and particularly to such sensors as employ a layer of cholesteric material as the temperature-responsive chromatic element.

There are many instances where temperature must be monitored to high standards of accuracy. It is customary to employ in such instances highly sensitive sensors and finely incremented readout devices in operative connection therewith. However, there are also many instances where a relatively rough estimate of temperature is satisfactory and where precise measurement is not practicable for various reasons.

For example it is desirable to maintain the temperature of blood undergoing artificial circulation or transfusion at or near body temperature. Thus, it is desirable for an attendant who is performing or assisting in the performance of such an operation to constantly monitor the actual blood temperature to ensure that it remains within the predetermined range of acceptability.

In accordance with the present invention, the colorimetric quality of cholesteric liquid crystals in sheet or layered form is employed in the chromatic indication of temperature to provide an easily-manufactured, easily-used rough temperature indicator which is particularly, but not exclusively, applicable to use on liquid conduits. In general, the invention comprises a layer of colorimetric material which is disposed on a body subject to temperature variations. The colorimetric cholesteric material is chosen such that the temperature range which produces a maximum color variation range corresponds to the expected or desired temperature range of the body or of material in good thermal contact with the body. The invention further comprises a protective layer of substantially clear nonpermeable material which is disposed over the cholesteric material layer so as to permit the layer to be applied in such locations where handling is normal.

In a preferred embodiment of the invention, a chromatic temperature indicator is provided for fluid conduits such as blood-carrying tubes wherein a band of black background material is first disposed on and around the conduit and is then covered with a layer of colorimetric cholesteric material the color changing temperature range of which corresponds to the desired temperature range of fluid to be transferred or conveyed through the conduit. The protective layer of nonpermeable plastic material is applied to the cholesteric layer in the form of a heat shrinkable plastic tube. To provide a ready-reference chart of colors and temperatures, a reference chart in band form is also disposed on the conduit adjacent the cholesteric layer and is provided with color elements corresponding to the expected color variations of the cholesteric material and at least rough indications of temperatures corresponding to the possible colors.

Figure 2:
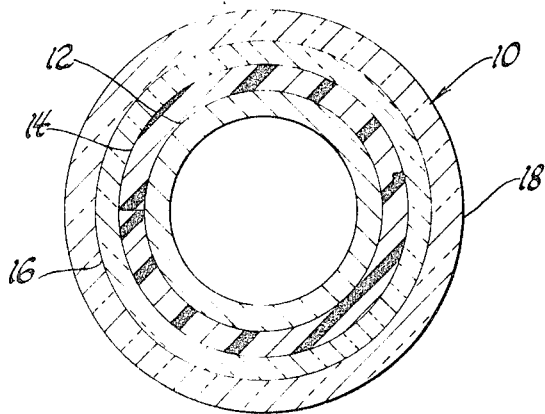

The invention will be best understood by reference to the following specification which describes a specific embodiment. This specification is to be taken with the accompanying drawings of which:

FIG. 1 is a side view including a partial cross-section of the embodiment of FIG. 2; and FIG. 2 is a cross-sectional view of a multilayer chromatic temperature sensor applied to a metal conduit.

Referring to FIGS. 1 and 2 there is shown a chromatic temperature sensor 10 of generally multilayered annular form disposed on and around a thermally conductive conduit 12 which may be employed to convey blood to a patient undergoing a transfusion operation. A metal such as copper may be preferred. Disposed on the conduit 12 at a point preferably near the exit end thereof is a band 14 of thin, plastic material, such as Mylar, which is adhesively bonded to the conduit 12. The outer surface of the sheet 14 is uniformly coated with a water base black paint thereby to provide a black background layer for a colorimetric cholesteric layer 16 which is applied such as by spraying directly over the Mylar sheet 14. The Mylar sheet 14 may alternatively be dyed black in the initial fabrication thereof.

The cholestric layer 16 is formed by spraying a colorimetric liquid crystal cholesteric material onto the surface of the Mylar sheet 14 so as to form a relatively thin colorimetric layer which, although normally colorless, experiences a color variation of a readily apparent nature when the temperature thereof is varied over a predetermined range of maximum colorimetric sensitivity. Such a material is available in liquid form from Liquid Crystal Industries Incorporated of Turtle Creek, Pennsylvania. Such material, when spread into sheet form, is caused to vary in color between red and blue with intermediate yellow and green colors over almost any desired temperature range between 0° C. and 184° C., the specific color-changing temperature range of any given layer being selectible between 2° C. and 50° C. In the instant application, the maximum color-changing temperature range of the material layer 16 is 4° F. (2.2° C.), a 96° F. temperature producing a red color, a 98° F. temperature producing a yellow color, and a 100° F. temperature producing a blue color.

The colorimetric cholesteric layer 16 after application remains somewhat greasy and delicate and, thus, is protectively coated with a nonpermeable heat-shrinkable polyester tube 18 which is disposed over the cholesteric layer 16 and heat shrunk by the application of a small amount of heat to form a snug protective fit thereover. Heat shrinkable nonpermeable, nonadhesive polyester material of a type which is preferred for the application of tube 18 is available in a 50 percent heat shrink character from the 3M Company.

In order that an at least rough temperature reading can be immediately made from the indicator 10, a reference chart 20 is disposed on the conduit 12 axially adjacent the cholesteric layer 16 which is visible through the nonpermeable but optically transparent polyester tube 18. Chart 20 includes three circumferentially spaced elements 22, 24, and 26 of red, yellow, and blue colors, respectively, thus representing the colors attained by the chromatic cholesteric layer 16 when experiencing temperatures between 96° and 100° F. The polyester tube 18 preferably covers the chart 20 as well as the cholesteric layer 16.

In operation, the conduit 12 is operationally connected with a source of fluid to be conveyed. The passage of such fluid through the conduit 12 heats (or cools) the cholesteric layer 16 which is in good thermal transfer relationship with the conduit 12. The colorimetric cholestric layer 16, thus, produces an apparent color which represents the temperature of the fluid. It is, of course, preferred that the fluid in the case of a blood transfusion be maintained at approximately 98.6° F. Thus, it is desirable that the indicator 10 produce a yellow indication which corresponds to the color of the reference chart element 24. If the temperature of the blood in conduit 12 becomes too high, a blue color is assumed by layer 16 and corresponds to the color of reference chart element 26. This warns the operator that the blood temperature is too high and should be decreased. If the blood temperature is too low, a relatively red color is assumed by the colorimetric cholestric layer 16 and this may be readily observed by comparing that color to the color of the reference chart element 22. An identity of color between cholesteric layer 16 and reference chart element 22 is, thus, an indication that the blood temperature should be elevated.

It is to be understood that the foregoing description relates to an embodiment which is illustrative in nature and, thus, is not to be constructed in a limiting sense.

The embodiments of the invention in which an exclusive property or privilege is claimed are defined as follows:

1. A chromatic temperature indicator for monitoring the temperature of fluid in a fluid conduit over a predetermined temperature range comprising: a layer of colorimetric cholesteric material carried by and in thermal contact with the conduit and having a maximum color-changing temperature range corresponding substantially to the predetermined range, and a protective layer of substantially clear, nonpermeable material over the cholesteric material layer, the protective layer being disposed in a continuous band about the conduit and being formed of a heat-shrinkable plastic.

2. A chromatic temperature indicator as defined in claim 1 including a reference chart carried by said conduit adjacent the cholesteric material layer and containing elements representing the colors within the color-changing temperature range.

3. A chromatic temperature indicator as defined in claim 1 including means between the body and the cholesteric material layer and defining a black background layer.

4. In combination: a tubular fluid conduit for conveying fluid the temperature of which is to be monitored over a predetermined range; a band of material secured to and around the conduit for establishing a black background, a layer of colorimetric cholesteric material on the band and having a maximum color-changing temperature range corresponding to the predetermined range; a color reference band on the conduit adjacent the layer of cholesteric material and including color reference elements representing colors within the color-changing temperature range and at least approximately the temperatures corresponding thereto, and a protective band of heat-shrinkable nonpermeable plastic disposed at least around the cholesteric material layer.

* * * * *